(12) United States Patent
Enomoto

(10) Patent No.: US 11,522,401 B2
(45) Date of Patent: Dec. 6, 2022

(54) RADIAL GAP TYPE ROTATING ELECTRICAL MACHINE

(71) Applicant: Hitachi, Ltd., Tokyo (JP)

(72) Inventor: Yuji Enomoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 16/980,522

(22) PCT Filed: Dec. 27, 2018

(86) PCT No.: PCT/JP2018/048114
§ 371 (c)(1),
(2) Date: Sep. 14, 2020

(87) PCT Pub. No.: WO2019/176234
PCT Pub. Date: Sep. 19, 2019

(65) Prior Publication Data
US 2021/0013760 A1    Jan. 14, 2021

(30) Foreign Application Priority Data

Mar. 16, 2018 (JP) .............................. JP2018-048925

(51) Int. Cl.
*H02K 3/493* (2006.01)
*H02K 21/16* (2006.01)

(52) U.S. Cl.
CPC .............. *H02K 3/493* (2013.01); *H02K 21/16* (2013.01)

(58) Field of Classification Search
CPC ........ H02K 3/493; H02K 3/487; H02K 3/345; H02K 21/16

(Continued)

(56) References Cited

U.S. PATENT DOCUMENTS 4,025,840 A * 5/1977 Brissey ................. H02K 21/16
322/49
7,122,934 B2 * 10/2006 Yamamoto .............. B29C 70/72
310/43

(Continued)

FOREIGN PATENT DOCUMENTS

CN          104380584 A       2/2015
JP         2003-518903 A      6/2003

(Continued)

OTHER PUBLICATIONS

Machine translation of JP-2015167432-A. (Year: 2015).*

(Continued)

*Primary Examiner* — Michael Andrews
(74) *Attorney, Agent, or Firm* — Foley & Lardner LLP

(57) ABSTRACT

A radial gap type rotating electrical machine using amorphous metal that can realize high efficiency and is excellent in productivity is provided. The radial gap type rotating electrical machine according to the present invention includes a rotor including a rotary shaft and a rotor iron core that rotates around the rotary shaft, and a stator including a stator iron core that is disposed to face the rotor iron core. The stator iron core has an annular shape and has a back yoke (4) having a plurality of recesses provided along inner periphery, and a tooth (3) having one end fitted to the recess and the other end protruding toward the rotor iron core, the tooth (3) has a laminate in which amorphous metal foil strips are laminated in an axial direction of the rotary shaft, and an insulating member (2) that holds the laminate, and a magnetic material (1) is provided in an end portion on a side facing the rotor of the insulating member (2).

5 Claims, 17 Drawing Sheets

(58) Field of Classification Search
USPC .................................. 310/214, 215, 216.096
See application file for complete search history.

(56) References Cited

U.S. PATENT DOCUMENTS

| | | | |
|---|---|---|---|
| 2001/0030486 A1* | 10/2001 | Pijanowski | ............ H02K 1/246 |
| | | | 310/67 R |
| 2002/0074885 A1 | 6/2002 | Decristofaro | |
| 2006/0082241 A1* | 4/2006 | Enomoto | ............ H02K 15/022 |
| | | | 310/216.057 |
| 2007/0145847 A1* | 6/2007 | Komuro | ................... H02K 1/02 |
| | | | 310/214 |
| 2011/0095642 A1* | 4/2011 | Enomoto | ............ H02K 15/022 |
| | | | 335/297 |
| 2015/0139830 A1 | 5/2015 | Nigo et al. | |

FOREIGN PATENT DOCUMENTS

| | | | |
|---|---|---|---|
| JP | 2003-309952 A | | 10/2003 |
| JP | 2004-201429 A | | 7/2004 |
| JP | 2005-094929 A | | 4/2005 |
| JP | 2005-323477 A | | 11/2005 |
| JP | 2005-333695 A | | 12/2005 |
| JP | 2007-174805 A | | 7/2007 |
| JP | 2008-079455 A | | 4/2008 |
| JP | 2011-193573 A | | 9/2011 |
| JP | 2013-021919 A | | 1/2013 |
| JP | 2015-167432 A | | 9/2015 |
| JP | 2015167432 A | * | 9/2015 |
| WO | WO-00/28640 A2 | | 5/2000 |

OTHER PUBLICATIONS

International Search Report with English translation and Written Opinion issued in corresponding application No. PCT/JP2018/048114 dated Feb. 26, 2019.
Office Action issued in corresponding Japanese Application No. 2018-048925 dated Dec. 14, 2021 with English translation.
Foreign Office Action Issued in corresponding Chinese Application No. 201880090476.5 dated Aug. 11, 2022 (17 pages).

* cited by examiner

RADIAL GAP TYPE ROTATING ELECTRICAL MACHINE

TECHNICAL FIELD

The present invention relates to a radial gap type rotating electrical machine.

BACKGROUND ART

A rotating electrical machine (motor) used as a power source of an industrial machine or for driving an automobile is required to have high efficiency. In order to obtain high efficiency of a motor, a low loss material or a permanent magnet with a high energy product is generally designed to be used as a material to be used.

Motor loss is mainly composed of copper loss, iron loss, and mechanical loss. When output characteristics (rotation speed and torque) of required specifications are determined, a mechanical loss is uniquely determined, and design of reducing an iron loss and a copper loss is important. The copper loss is mainly determined by a relationship between a resistance value of a coil and a current, and design is made so that reduction of a coil resistance value and reduction of residual magnetic flux density of a magnet are suppressed by cooling. The iron loss can be reduced depending on a soft magnetic material used. In general motors, electromagnetic steel sheets are used for an iron core portion, and those with different loss levels depending on their thickness and Si content are used.

As a soft magnetic material, iron-based amorphous metal, which has higher magnetic permeability and a lower iron loss than an electromagnetic steel sheet, and a high-performance material such as FINEMET and a nanocrystalline material exist. These materials have many problems in manufacturing a motor at low cost, such as that they have an extremely small thickness of 0.025 mm, and has a Vickers hardness of about 900 and is more than 5 times as hard as an electromagnetic steel sheet.

Conventionally, it has been reported that amorphous metal is applied to an axial gap type motor. However, use of amorphous metal is limited to use in a same cross-section iron core of a two-rotor type axial gap motor. A stator of this two-rotor type axial gap motor has a stator configured in an axial center, and the stator iron core and a coil wound around the stator iron core are not fastened to a housing of the motor as a structure, and make a floating island structure. The floating island-shaped stator iron core and coil are fixed to the housing by resin molding. This structure can be designed to withstand a torque reaction-force of the motor and thermal stress when the temperature rises to some extent. However, due to a difference in linear expansion coefficient between resin and the coil, and between resin and the iron core, a housing material, and the like, size, a temperature condition for use, and the like of the motor are limited.

In view of the above, in order to solve the above-mentioned problem of the axial gap type, it is conceivable to use amorphous metal for a radial gap type motor. PTL 1 discloses a bulk amorphous metal magnetic constituent for use in a high efficiency electric motor having a polyhedral shape and including a plurality of amorphous metal strip layers. PTL 1 proposes a method of providing a plurality of polyhedral shaped magnetic constituents having a predetermined three-dimensional shape by cutting an amorphous metal strip material into a plurality of cut strips having a predetermined length, forming a bar of the amorphous metal strip material by stacking the strips, impregnating the stacked bars with epoxy resin after annealing, curing the stacked bars, and cutting the stacked bars into a predetermined length.

Further, PTL 2 discloses a method of manufacturing an amorphous laminated iron core by punching and laminating iron core pieces from an amorphous thin plate material. The manufacturing method of an amorphous laminated iron core is characterized by punching a required portion of an iron core piece from the amorphous thin plate material and also forming a connecting hole, blanking the iron core piece to a die hole, laminating the iron core pieces up to a desired lamination thickness on a pedestal that can move forward and backward when the die hole is viewed from a lower direction, retracting the pedestal from a lower direction of the die hole, gripping and constraining the laminated iron core laminated on the pedestal, injecting an adhesive coupling agent to fill the connecting hole of the laminated iron core, and performing connection. PTL 2 shows an example in which a predetermined motor core shape is internally punched by a progressive die similarly to press punching of a motor core with an electromagnetic steel sheet. In this example, the shape can be processed by punching. However, an amorphous foil strip is too thin to perform crimping fastening between the plates realized by an electromagnetic steel sheet. Accordingly, a method of using and injecting an adhesive into a predetermined hole of a core in a state of being laminated on a jig to laminate and fix the core is proposed.

CITATION LIST

Patent Literature

PTL 1: JP 2013-21919 A
PTL 2: JP 2003-309952 A

SUMMARY OF INVENTION

Technical Problem

The method of applying amorphous metal to the radial gap type rotating electrical machine shown in PTLs 1 and 2 described above has problems such as that an apparatus for performing special machining for manufacturing a machine is required and processing requires too much time. Further, in PTL 1, a bulk amorphous metal bar is impregnated with epoxy resin, cured, and then fixed to a housing. In this structure, like the axial gap type motor described above, due to a difference in linear expansion coefficient between resin and the coil, and between resin and an iron core, a housing material, and the like, size, a temperature condition for use, and the like of a motor are limited.

Furthermore, in PTL 2, amorphous metal is pressed and laminated. However, since thickness of the amorphous metal is 1/10 or less that of an electromagnetic steel sheet, the number of times of pressing is required to be ten times as many. Further, amorphous metal, which is five times as hard as an electromagnetic steel sheet, has an effect five times as large on a mold. Therefore, as compared to an electromagnetic steel sheets, an effect on the mold is 50 times as large or more, and usually, manufacturing is performed by re-polishing the mold about every two million times. However, since it is 1/50 or less, a large increase in manufacturing cost is caused. In a case where pressing is performed at a speed of 180 shots per minute (SPM), it reaches two million times in about one month. However, in a case where pressing is performed at the same speed, the production tact is ten times as much due to the number of sheets. Therefore, the re-polishing of the mold must be done within one day. It takes a lot of man-hours to polish a die and a punch of a large-sized mold, including work of loading and unloading of the mold from a press apparatus, which shows that production under these conditions is not realistic.

As described above, with respect to the manufacture of a radial gap type motor using amorphous metal, a structure that can be manufactured at a practical level, and a manufacturing apparatus and a manufacturing method of the structure have not been found in actuality.

In view of the above circumstances, an object of the present invention is to provide a radial gap type rotating electrical machine using amorphous metal that can realize high efficiency and is excellent in productivity.

Solution to Problem

In order to solve the above-mentioned problem, according to one aspect, a radial gap type rotating electrical machine of the present invention is characterized by including a rotor including a rotary shaft and a rotor iron core that rotates around the rotary shaft, and a stator including a stator iron core that is disposed to face the rotor iron core. The stator iron core has an annular shape and has a back yoke having a plurality of recesses provided along inner periphery, and a tooth having one end fitted to the recess and the other end protruding toward the rotor iron core, the tooth has a laminate in which amorphous metal foil strips are laminated in an axial direction of the rotary shaft, and an insulating member that holds the laminate, and a magnetic material is provided in an end portion on a side facing the rotor of the insulating member.

A more specific configuration of the present invention is described in claims.

Advantageous Effects of Invention

According to the present invention, a radial gap type rotating electrical machine using amorphous metal that can realize high efficiency and is excellent in productivity can be provided.

An object, a configuration, and an advantageous effect other than those described above will be clarified in description of an embodiment below.

DESCRIPTION OF EMBODIMENTS

Figure 1A:
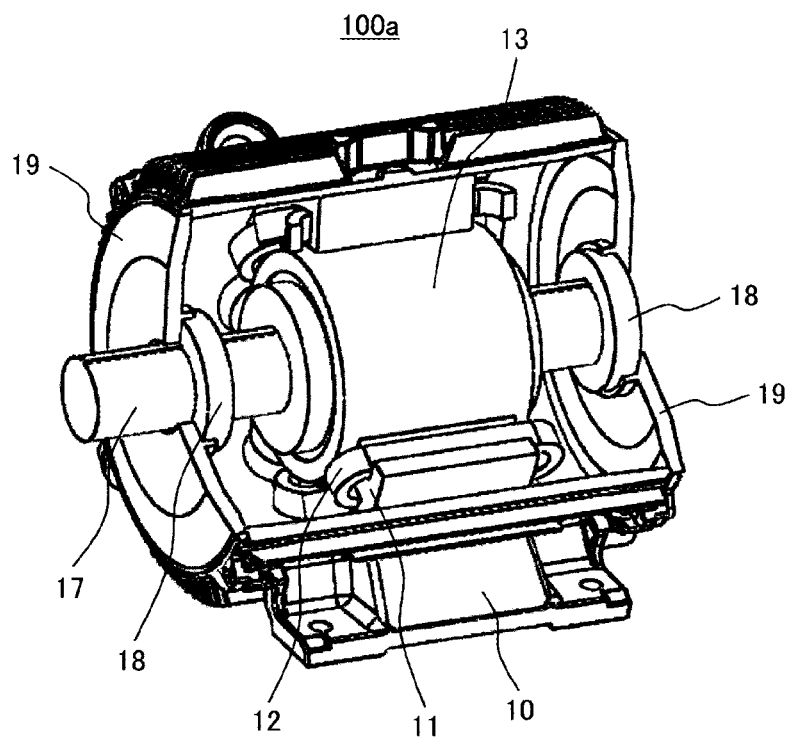
FIG. 1A is a schematic diagram showing an example (inner rotor type) of a conventional radial gap type rotating electrical machine.

Hereinafter, an embodiment of the present invention will be described with reference to the drawings and the like. In all the drawings for explaining the present invention, components having the same function are denoted by the same reference numeral, and repeated description of the components may be omitted.

Figure 1B:
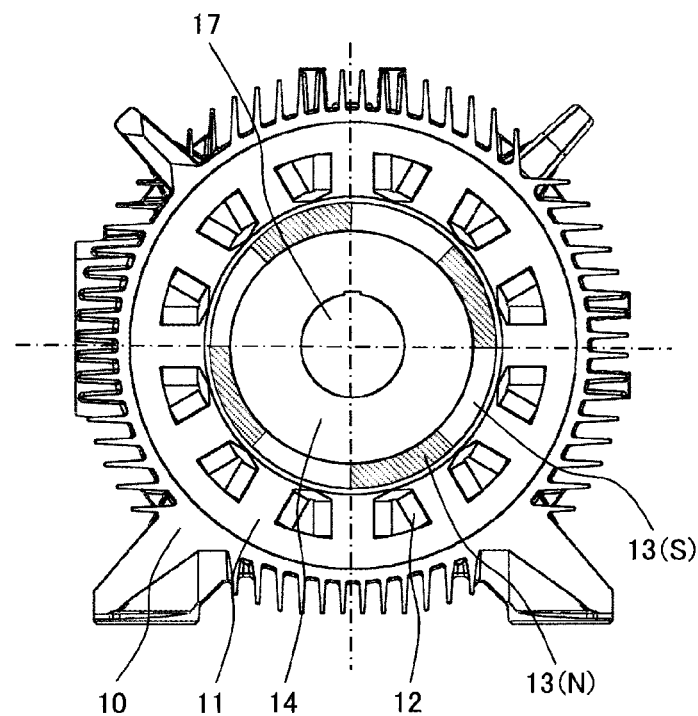
FIG. 1B is a center cross-sectional view in an axial direction of FIG. 1A

Prior to the description of the radial gap type rotating electrical machine of the present invention, a configuration of a conventional radial gap type rotating electrical machine will be described. FIG. 1A is a schematic diagram showing a structure of a conventional radial gap type motor (inner rotor type), and FIG. 1B is a center cross-sectional view in an axial direction of FIG. 1A. As shown in FIGS. 1A and 1B, a radial gap type rotating electrical machine 100a generally has a cylindrical shape. A stator iron core (stator iron core) 11 is disposed at an axial center of a housing 10 provided with a heat radiation fin on an outer side portion.

In a slot portion of the stator iron core 11, a stator coil 12 wound around a tooth portion is mounted, and a rotor provided with a permanent magnet 13 and a rotor iron core (magnetic core) 14 is rotatably held on an inner side of the stator by a bearing 18. The bearing 18 is held by an end bracket 19 provided at both ends in an axial direction of the housing, and holds the rotor in the axial direction and a gravitational direction. A rotary shaft (shaft) 17 is attached to the center of the rotor, and an output shaft is configured by penetrating a hole of the end bracket 19 on a front side.

As shown in FIG. 1B, the rotor iron core 14 is disposed around the shaft 17, and the permanent magnet 13 is disposed on its surface. FIG. 1B illustrates an eight-pole structure, in which an N-pole magnet 13(N) and an S-pole magnet 13(S) are alternately disposed.

The stator iron core is made from a soft magnetic material, and generally an electromagnetic steel sheet is used for the stator iron core. The electromagnetic steel sheet is punched by a press mold and laminated. Amorphous metal is a material that has a significantly smaller loss than an electromagnetic steel sheet and can contribute to higher efficiency of a motor. However, since it has an extremely high hardness as described above, punching a slot type motor core as illustrated with a press and laminating the core are difficult to perform. For this reason, it has conventionally been difficult to apply amorphous metal to a rotating electrical machine having the structure shown in FIGS. 1A and 1B.

Figure 2A:
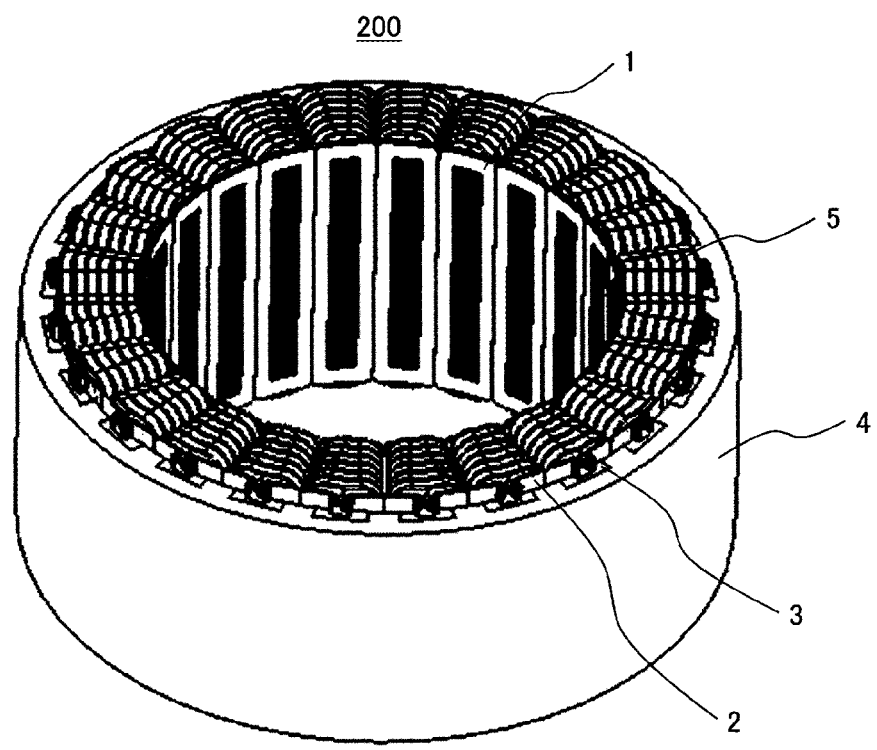
FIG. 2A is a perspective view showing a first example of a stator that constitutes a radial gap type rotating electrical machine (inner rotor type) of the present invention.
Figure 2B:
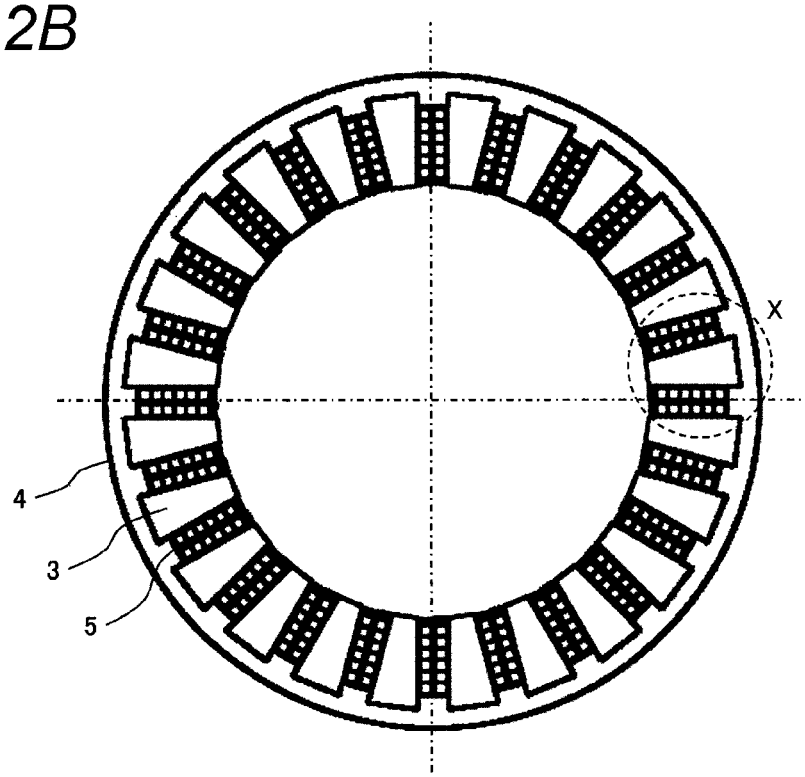
FIG. 2B is a top view of FIG. 2A.
Figure 2C:
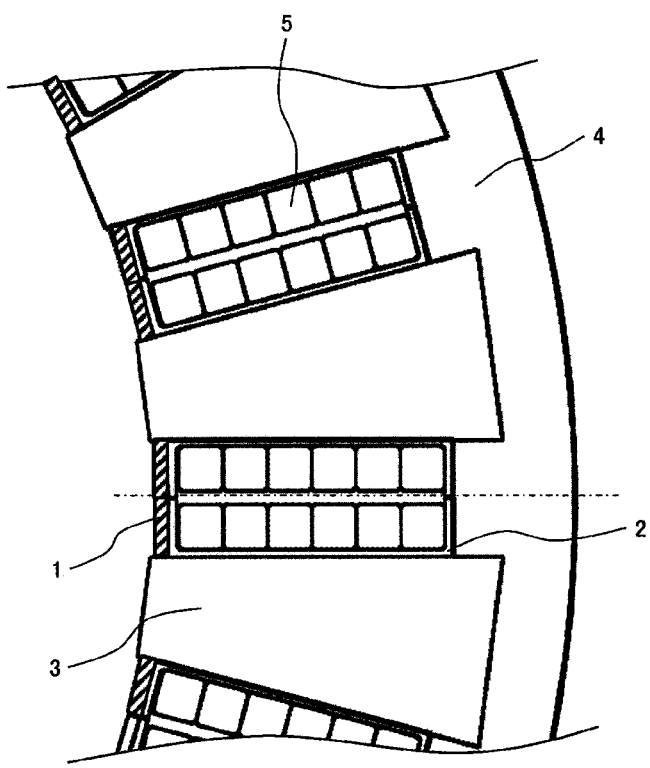
FIG. 2C is an enlarged view of a portion X in FIG. 2B.

Next, the radial gap type rotating electrical machine of the present invention will be described. FIG. 2A is a perspective view showing an example of a stator constituting the radial gap type rotating electrical machine of the present invention, FIG. 2B is a top view of FIG. 2A, and FIG. 2C is a diagram enlarging a portion X of FIG. 2B. The radial gap type rotating electrical machine of the present invention includes, as a basic configuration, a rotor including a rotary shaft and a rotor iron core that rotates around the rotary shaft, and a stator including a stator iron core that is disposed to face the rotor iron core.

The stator iron core has an annular shape as shown in FIGS. 2A and 2B. Then, as shown in FIGS. 2B and 2C, the stator iron core has a back yoke 4 having a plurality of recesses provided along the inner circumference, and a tooth 3 having one end fitted to the recess of the back yoke 4 and the other end protruding toward the rotor iron core. In FIG. 2A, 48 of the teeth 3 are disposed in a circumferential direction of the back yoke 4 and inserted from an axial direction of the rotary shaft to constitute a stator 200 having an annular shape. In the radial gap type rotating electrical machine of the present invention, amorphous metal is applied to the tooth 3, and a magnetic member 1 is provided in an end portion on a side facing the rotor of the teeth 3.

Figure 3A:
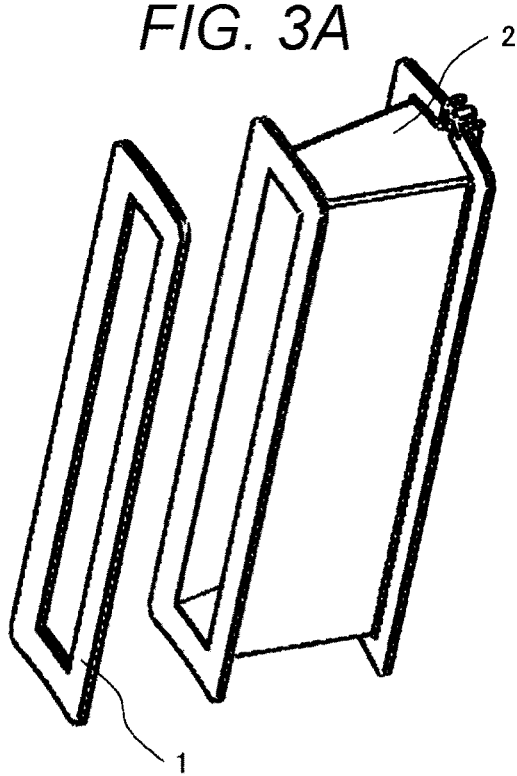
FIG. 3A is an exploded perspective view of an insulating member constituting part of a tooth shown in FIG. 2A.
Figure 3B:
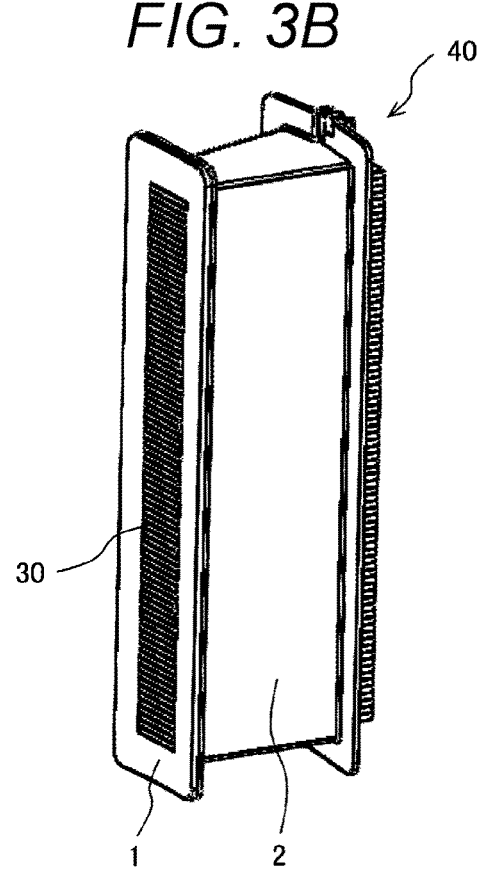
FIG. 3B is a diagram in which a laminate of an amorphous metal foil strip is housed in an insulating member of FIG. 3A.
Figure 3C:
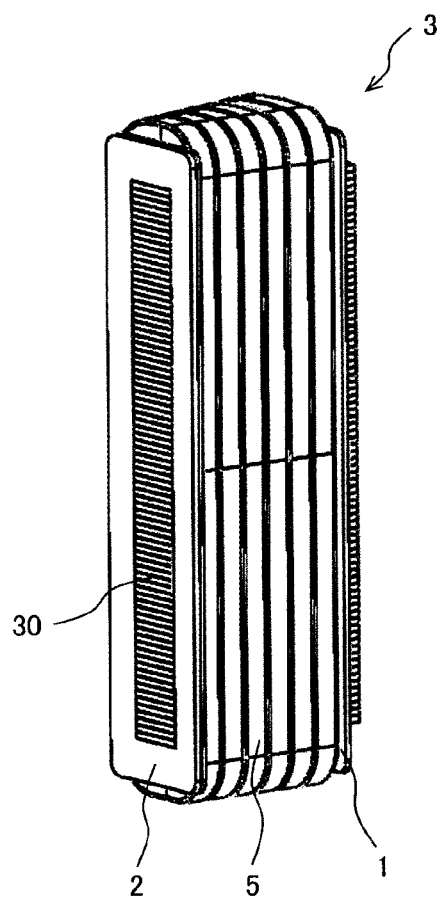
FIG. 3C is a diagram in which a winding is provided on an insulating member of FIG. 3B.

Next, the configuration of the tooth will be described in detail. FIG. 3A is an exploded perspective view of a bobbin constituting part of the tooth of FIG. 2A, FIG. 3B is a diagram in which a laminate of an amorphous metal foil strip 30 is housed in the bobbin of FIG. 3A, and FIG. 3C is a diagram in which a winding is provided on the bobbin of FIG. 3B. As shown in FIGS. 3A to 3C, the tooth 3 is configured in such a manner that a laminate 40 in which the amorphous metal foil strips 30 are laminated in the axial direction of the rotary shaft is housed in an insulating member (bobbin) 2. Then, a coil conductor 5 is wound in a state where the insulating member 2 maintains electrical insulation between the teeth 3 and the back yoke 4. By being inserted into the insulating member 2, the laminate 40 is held in a constant shape by the friction in its lamination direction. That is, the friction on a surface of the amorphous metal foil strip makes it difficult for the metal foil strips to be displaced from each other, and the metal foil strips can be held without using an adhesive or the like in particular. With such a configuration, the amorphous metal foil strip 30 can be fixed to the insulating member 2 without separately providing fixation between the amorphous metal foil strips 30.

As described above, in the present invention, by constituting the tooth having a high magnetic flux density with the amorphous metal, it is possible to significantly reduce the loss generated in the stator iron core due to a change in a magnetic flux. Amorphous metal is an extremely hard material. However, since it is easy to shear a material sheet of amorphous metal, in the present invention, the amorphous metal foil strip 30 obtained by shearing a material sheet of amorphous metal is laminated and housed in the insulating member 2 to form the tooth 3.

The amorphous metal foil strip constituting the tooth 3 has a trapezoidal shape, and a side surface of the tooth is a straight line for the convenience of manufacturing the tooth by shearing. The amorphous metal foil strip having a trapezoidal shape has a pair of bottom sides (long side and short side) parallel to each other, and an angle θ formed by a pair of sides (legs) between the long side and the short side has an angle obtained by dividing 360° of the inner circumference of the back yoke 4 by the number of slots of the stator iron core. For example, if the number of slots is 48, then θ=360°÷48=7.5°. A recess of the back yoke 4 has a shape to which end portions on the long side of the tooth 3 can be fitted, and the tooth 3 has a shape that tapers from the back yoke 4 toward the rotor. Therefore, the tooth 3 does not come out to the rotor side (gap side (inner peripheral side)).

The material of amorphous metal is not particularly limited, and, for example, Metglas 2605HB1M (composition: Fe—Si—B), Metglas 2605SA1 (composition: Fe—Si—B), Metglas 2605S3A (composition: Fe—Si—B—Cr), and Metglas 2705M (composition: Co—Fe—Ni—Si—B—Mo) manufactured by Hitachi Metals, Ltd. are preferably used. The above-mentioned "Metglas" is a registered trademark of Metglas Incorporated, a group company of Hitachi Metals, Ltd.

As shown in FIG. 3A, the magnetic member 1 including a magnetic material is provided in an end portion on a side facing the rotor of the insulating member 2. With such a configuration, magnetic characteristics of the rotating electrical machine can be improved. Specifically, a tip portion of the tooth 3 has magnetism so that a magnetic flux from the rotor can be collected in a magnetic portion, so that magnetic flux density distribution in the circumferential direction of a gap between the stator and the rotor can be made uniform.

Figure 4A:
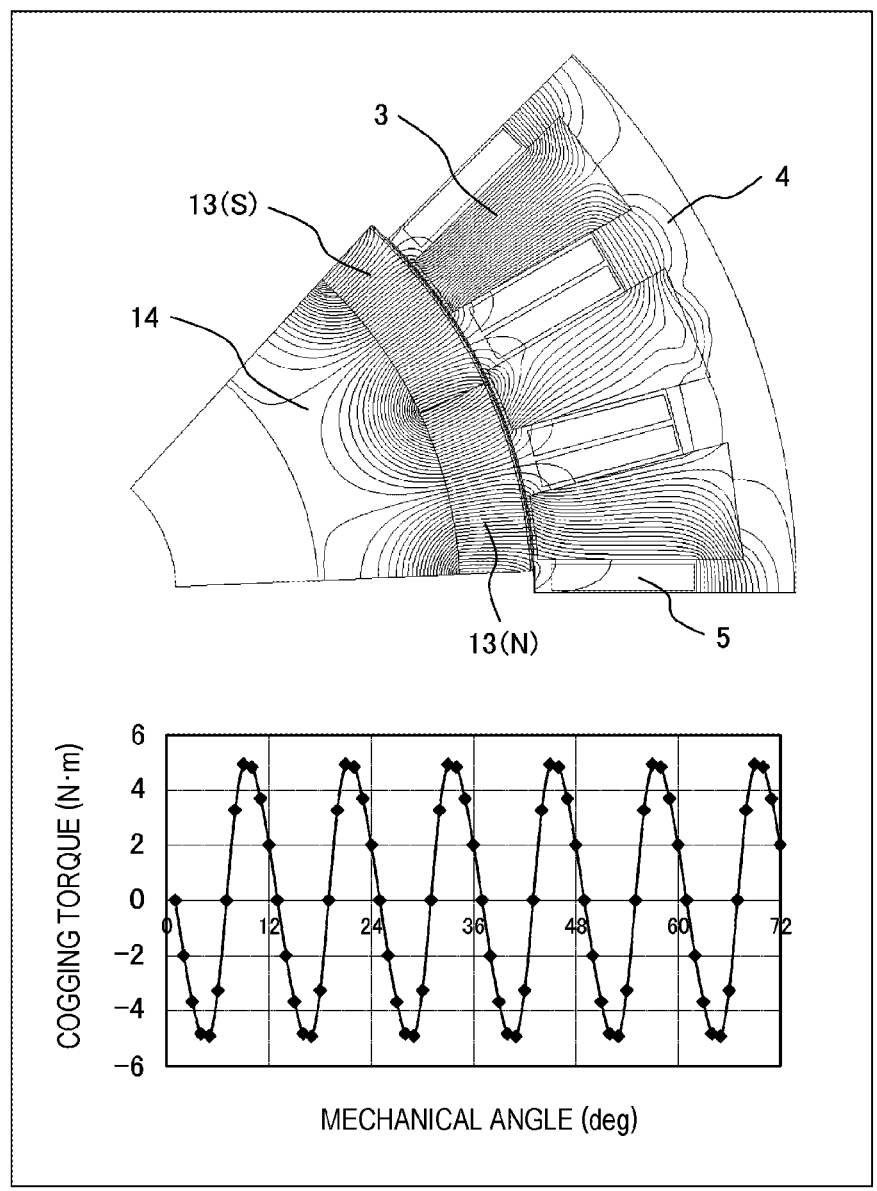
FIG. 4A is a graph showing a relationship between a mechanical angle and cogging torque of a rotating electrical machine that uses a stator not provided with a magnetic material as an insulating member.

An effect of the magnetic member 1 provided in an end portion of the insulating member 2 will be described in more detail. FIG. 4A is a graph showing a relationship between cogging torque and a mechanical angle of a rotating electrical machine that uses a stator that does not have a magnetic material provided on the bobbin, and a graph showing a relationship between cogging torque and a mechanical angle of a rotating electrical machine that uses a stator that has a magnetic material provided on the bobbin. FIG. 4A shows a result of analyzing a rotating electrical machine having a stator that does not have a magnetic member provided at a tip of the insulating member 2 and has a shape in which a slot opening portion is opened. In this example, the back yoke 4 and the rotor iron core 14 are given magnetic characteristics equivalent to 30A300 of an electromagnetic steel sheet, and the tooth 3 is given magnetic characteristics of iron-based amorphous metal.

Further, a magnet performance curve with a residual magnetic flux density of 0.9 T is given to a magnet portion. The graph shows a calculation result of torque generated in a gap portion generated at a rotation angle when the rotor is rotated. Since current to the coil conductor 5 is not taken into consideration, a calculation result of this torque shows cogging torque (a torque fluctuation accompanying a fluctuation of a rotating position of a magnet magnetic flux). Both amplitudes of a peak value of the cogging torque in the model shown in FIG. 4A are accompanied by a large fluctuation of about 10 N·m.

Figure 4B:
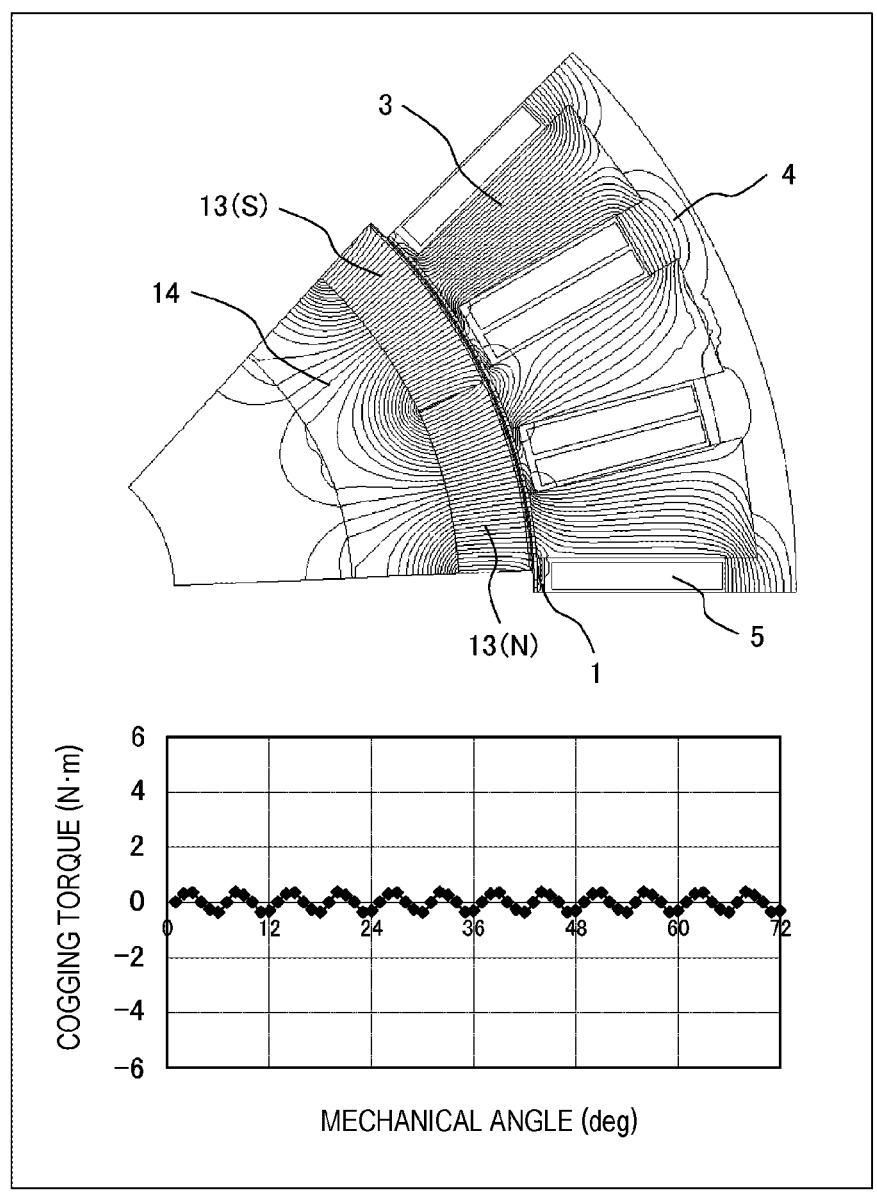
FIG. 4B is a graph showing a relationship between a mechanical angle and cogging torque of a rotating electrical machine that uses a stator provided with a magnetic material as an insulating member.

On the other hand, FIG. 4B shows a calculation result in a case where the magnetic member 1 is disposed at the tip of the insulating member 2. The tooth 3, the back yoke 4, and the rotor iron core 14 are given as material conditions similar to those in FIG. 4A, and a magnetic material having a magnetic permeability of 100 is modeled as the magnetic member 1 at the tip of the insulating member 2. It is found that cogging torque is as small as 1 N·m or less in both amplitudes, and the cogging torque is significantly reduced. Further, comparing the magnetic flux charts of FIGS. 4A and 4B, it can be seen that the density of the magnetic flux lines is higher in FIG. 4B. This is because the magnetic flux that is not linked to the stator side as leakage is generated in the magnet in the release structure of FIG. 4A can be effectively linked to the stator in the structure of FIG. 4B. In this manner, torque (current×magnetic flux amount) of the motor can be improved, and a structure in which torque pulsation, cogging torque, and the like can be significantly reduced can be obtained.

Further, in a case of using an ultra-low iron loss material such as an amorphous or a high residual magnetic flux density nanocrystalline alloy, an iron loss generated in a stator tooth portion can be significantly reduced. Accordingly, high efficiency of the rotating electrical machine can also be realized at the same time.

As the magnetic member 1, a soft magnetic material or a hard magnetic material can be used, and an electromagnetic steel sheet, a dust core, an amorphous, a nanocrystalline alloy, a soft magnetic ferrite, a hard magnetic ferrite, rare earth magnet powder, and the like are preferable. The magnetic member 1 may be provided on the entire end portion of the insulating member 2 as shown in FIG. 3A, but may be provided on part of the end portion if the effect can be obtained. Further, the thickness of the magnetic member 1 is preferably 1 mm or more and 2 mm or less. If the thickness of the magnetic member 1 is less than 1 mm, the effect of improving the magnetic properties obtained by providing the magnetic member 1 becomes insufficient, and if the thickness exceeds 2 mm, the area for providing the winding of the insulating member 2 becomes small and the effect of improving the magnetic properties becomes insufficient.

Figure 5A:
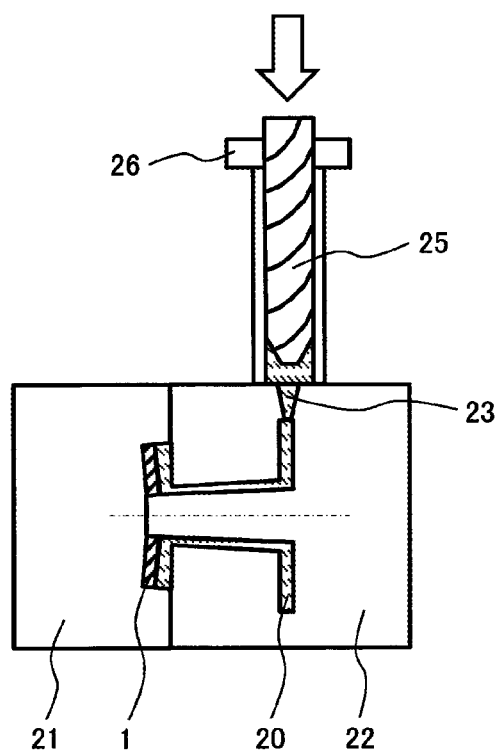
FIG. 5A is a schematic cross-sectional view showing a first example of a method for manufacturing an insulating member having a magnetic material.
Figure 5B:
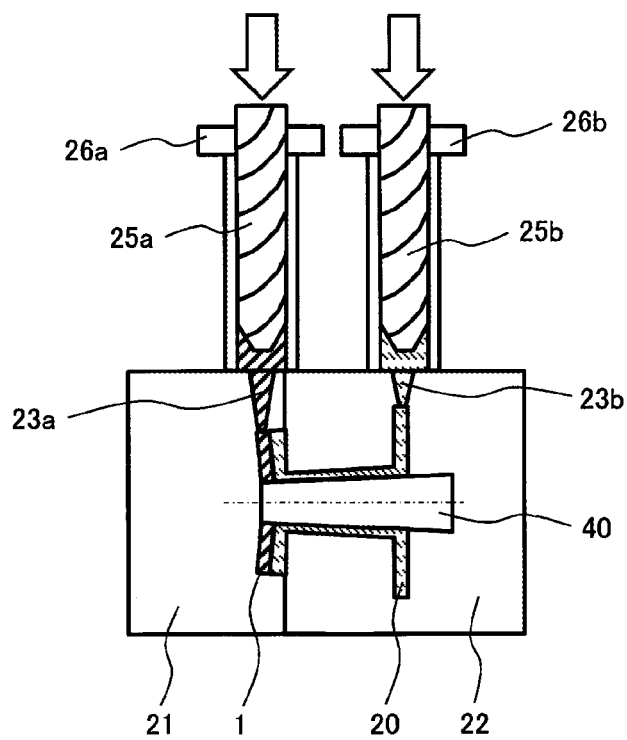
FIG. 5B is a schematic cross-sectional view showing a second example of a method for manufacturing an insulating member having a magnetic material.

A method for manufacturing the above-mentioned magnetic member 1 will be described. FIG. 5A is a schematic cross-sectional view showing a first example of a method of manufacturing a bobbin having a magnetic material, and FIG. 5B is a schematic cross-sectional view showing a second example of the method of manufacturing a bobbin having a magnetic material. FIGS. 5A and 5B show schematic diagrams of an injection molding die system for molding the insulating member 2 made from resin including a magnetic material. Usually, manufacturing in injection molding is performed in a method, in which thermoplastic resin melted at a high temperature is injected into space formed in a mold by a fixed cylinder 26 and a movable plunger 25 from a resin injection port 23 like a syringe, and, in a state where the resin is solidified in the mold, the mold is opened and the resin is removed.

FIG. 5A shows a method of injecting insulating thermoplastic resin in a state where the magnetic member 1 provided in a tip portion of the tooth is disposed in molds 21 and 22 in advance. An injection temperature of the thermoplastic resin, which depends on a material, is about 150° C. to 250° C. Accordingly, resin having heat resistance equal to or more than that is desirable. As the magnetic member 1, as described above, an electromagnetic steel sheet, a ferromagnetic material (soft magnetic material) such as a dust core or these materials in a power state, or magnetic powder (hard magnetic material) having a smaller particle size than those, or a composite material of them and resin is preferably used. Further, in a case of a composite material, its base resin is preferably the same material as an insulating material 20 constituting the insulating member 2. By using the same materials for the base resin constituting the magnetic member 1 and the insulating material constituting the insulating member 2, the bonding strength between the magnetic member 1 and the insulating member 2 can be increased.

FIG. 5B shows a method of simultaneously molding the magnetic member 1 and the bobbin 2. Manufacturing is performed in a manner that a pellet of the magnetic material that is a raw material of the magnetic member 1 is put into a cylinder 26a and a pellet of the insulating material that constitutes the insulating member 2 is put into a cylinder 26b to be melted, and plungers 25a and 25b are controlled so that the resins are injected to a predetermined location at the same time. This makes it possible to obtain an integrally molded product of the magnetic member 1 and the insulating member 2 by only one molding step. Furthermore, FIG. 5B shows a structure in which the laminate 40 of amorphous metal foil strips is also disposed in the mold, and injection molding is directly performed around it to integrate them. In this manner, the laminate 40, the insulating member 2, and the magnetic member 1 are integrated, and a component having excellent accuracy and strength can be obtained.

Figure 6A:
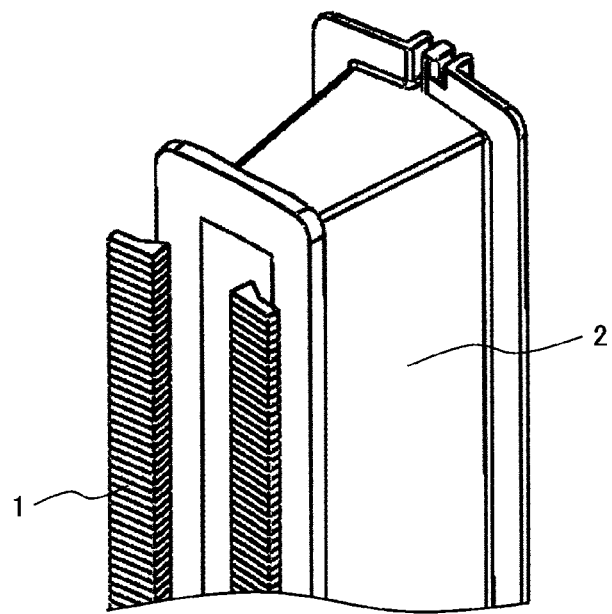
FIG. 6A is a perspective view showing a second example of a tooth block.
Figure 6B:
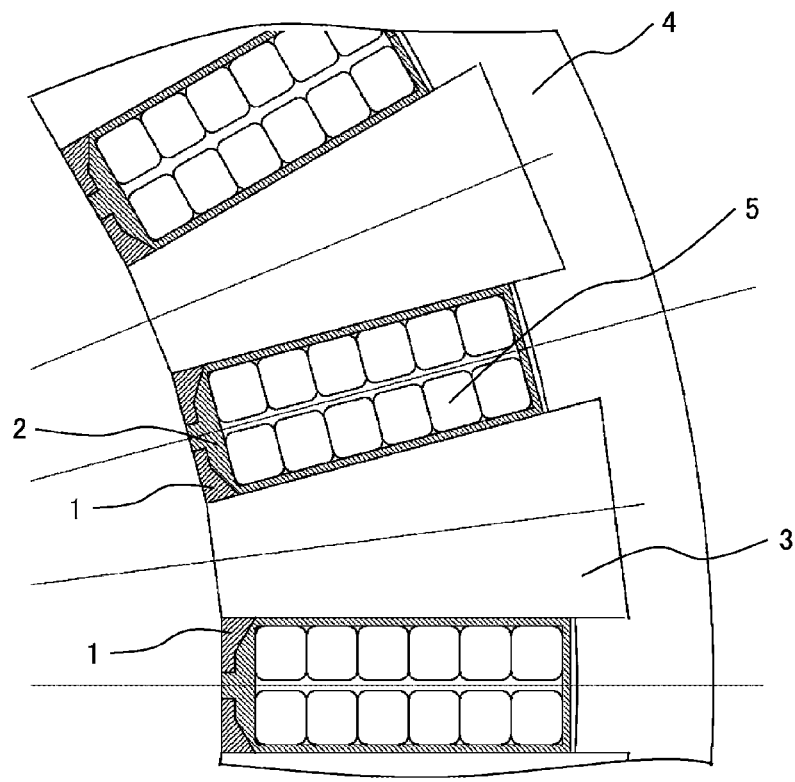
FIG. 6B is a cross-sectional view showing part of a stator including the tooth block of FIG. 6A.

FIG. 6A is a perspective view showing a second example of a tooth block, and FIG. 6B is a cross-sectional view showing part of a stator including the tooth block of FIG. 6A. Considering integration by the injection molding insert molding method as described above, the magnetic member 1 can have various cross-sectional shapes. In FIG. 6A, an inner diameter side of the magnetic member 1 has an R shape along an inner diameter of the stator, and has a shape that is narrowed toward the adjacent tooth 3. In this manner, a magnetic flux collected from a tip portion of the tooth 3 is not saturated and is easily linked to the tooth 3. Further, the slot opening portion may have a semi-closed (half-closed) structure instead of a fully-closed structure. A cross-sectional view is shown in FIG. 6B, where electrical insulation between the coil conductor 5 and the tooth 3, and the magnetic member 1 is shown to be ensured.

Figure 7A:
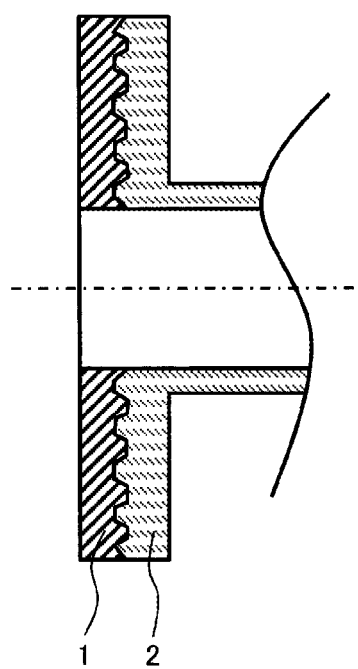
FIG. 7A is a perspective view showing a second example of the tooth block.
Figure 7B:
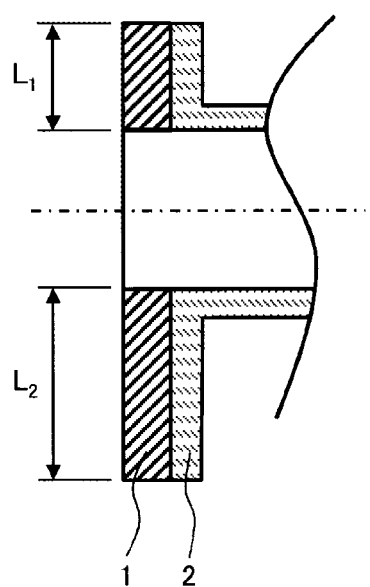
FIG. 7B is a perspective view showing a third example of the tooth block.
Figure 7C:
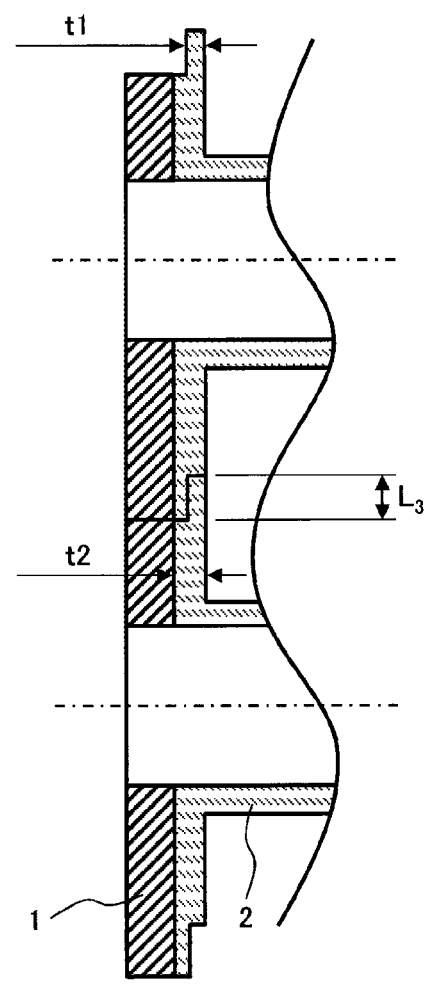
FIG. 7C is a perspective view showing a fourth example of the tooth block.

Another example of the shape of the tooth block will be shown. FIG. 7A is a perspective view showing a second example of the tooth block, FIG. 7B is a perspective view showing a third example of the tooth block, and FIG. 7C is a perspective view showing a third example of the tooth block.

FIG. 7A shows a shape in which a coupling surface between the magnetic member 1 and the insulating member 2 is formed in a corrugated shape to increase the area and increase a bonding area with the insulating member 2. A similar effect can be obtained when the coupling surface between the magnetic member 1 and the insulating member 2 is an uneven shape and a knurled shape, in addition to the corrugated shape. In FIG. 7B, a collar portion (projection portion) at a tooth tip has different dimensions ($L_1$ and $L_2$) on the left and right of the tooth tip. Further, FIG. 7C shows a structure in which adjacent one of the insulating members 2 wrap each other in addition to the left-right asymmetry of the tooth tip shown in FIG. 7B. This is to secure a creepage distance from the coil conductor 5 to the magnetic member 1. The shape is effective for a motor with high voltage specifications. A distance of $L_3$ is adjusted to dimension determined by the insulation standard.

Figure 8A:
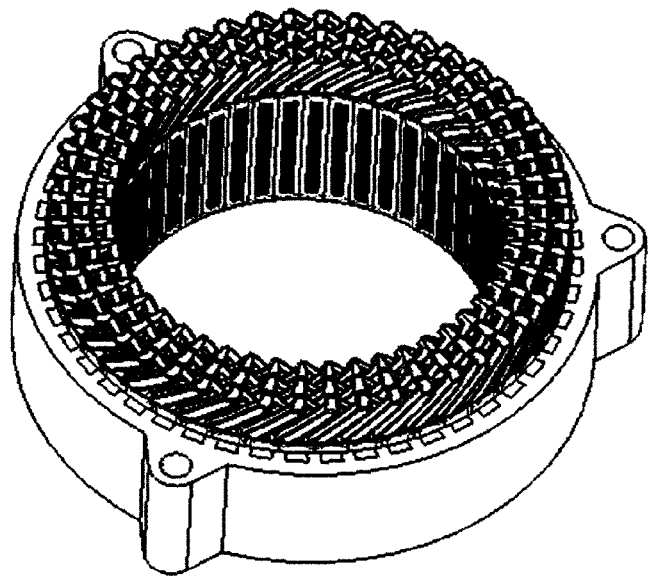
FIG. 8A is a perspective view showing another example of the stator.
Figure 8B:
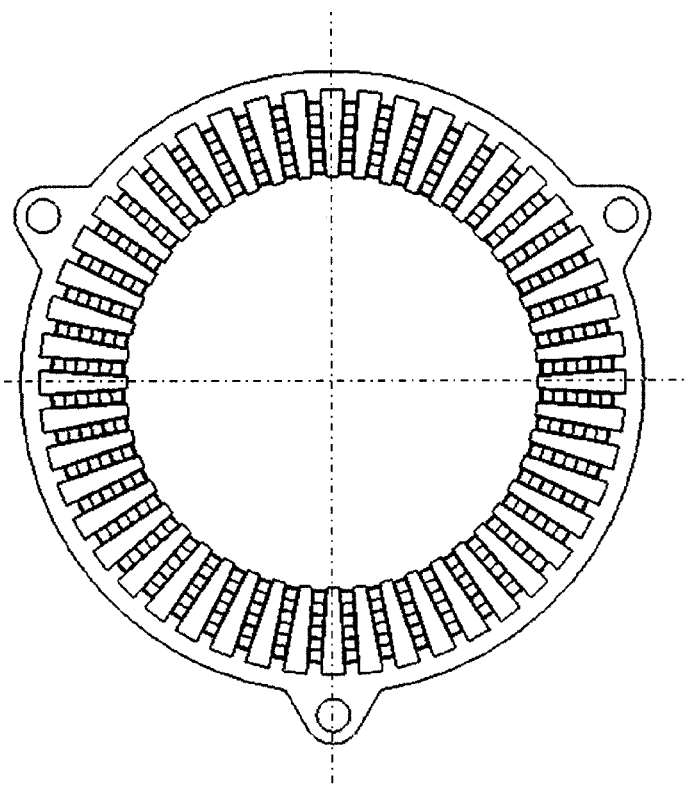
FIG. 8B is a top view of FIG. 8A.
Figure 8C:
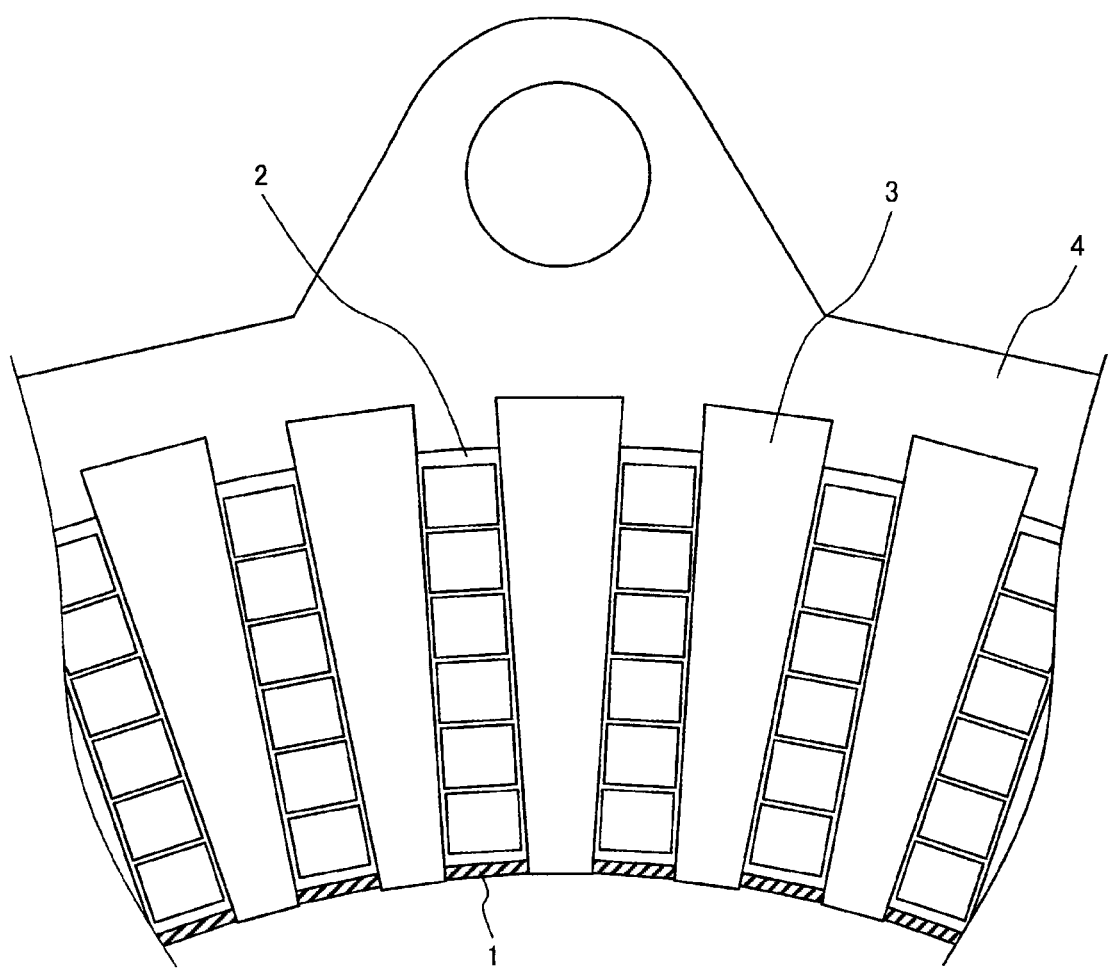
FIG. 8C is a top view enlarging part of FIG. 8A.

FIG. 8A is a perspective view showing another example of the stator, FIG. 8B is a top view of FIG. 8A, and FIG. 8C is a top view enlarging part of FIG. 8B. As shown in FIGS. 8A to 8C, the present invention can be applied to a configuration in which a coil conductor is provided in distributed winding. In a distributed winding structure, the coil is disposed over a plurality of slots as shown in FIGS. 8A and 8B, and it is difficult to apply a winding to a single tooth.

Figure 8D:
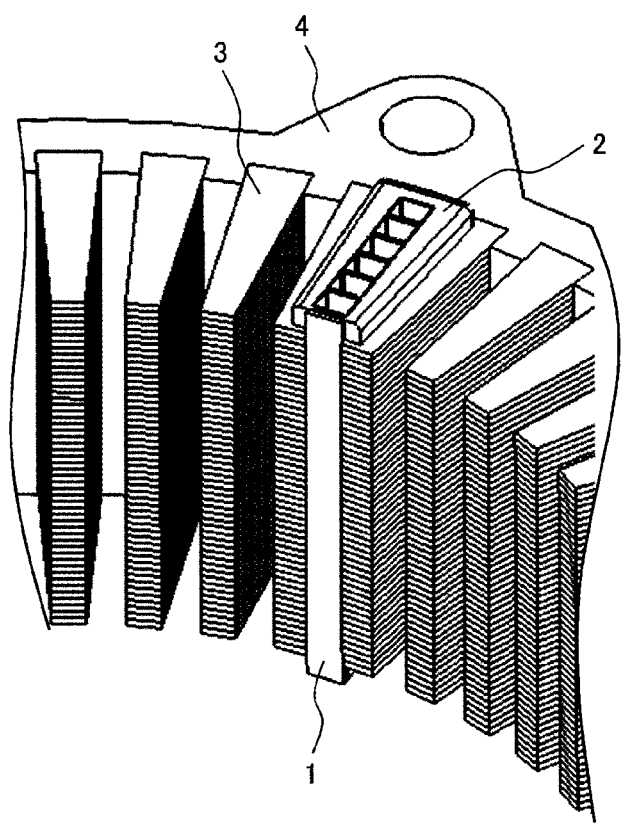
FIG. 8D is a perspective view enlarging part of FIG. 8A.
Figure 8E:
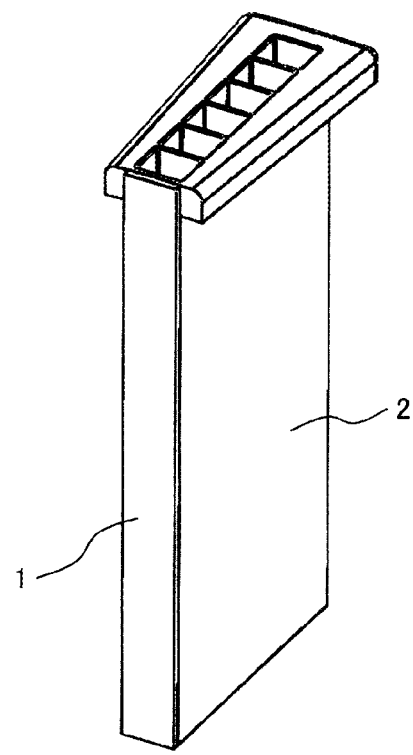
FIG. 8E is a diagram of a tooth block in FIG. 8A

FIG. 8D is a perspective view enlarging part of FIG. 8A, and FIG. 8E is a diagram of the tooth block of FIG. 8A. As shown in FIG. 8E, the shape corresponds to a straight slot so that the coil conductor can be disposed in each slot, and the magnetic member 1 is disposed at its tip portion. A portion extending from an axial direction of the rotary shaft of the slot has certain thickness to increase rigidity. This is for protection by the insulating member 2 in order to prevent damage to the insulation of a core end at a slot exit portion in a step of re-arrangement for bending one coil so that it can be connected in the assembly performed by inserting a winding from the axial direction. The inside of the slot has a structure divided into small chambers so that a coil having a quadrangular cross section can be easily inserted, and coils in the slot can also be insulated. An inner diameter side of the slot has the stator inner diameter R surface as described above, and is designed to reduce a change in the gap magnetic flux density. As shown in FIGS. 8D and 8E, the magnetic member 1 is disposed on a side surface of the rotor as in a case of concentrated winding.

Figure 9A:
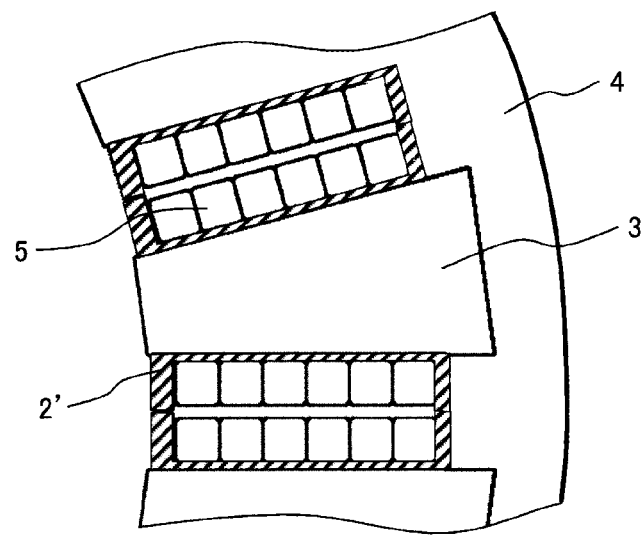
FIG. 9A is a top view showing a second example of the stator that constitutes the radial gap type rotating electrical machine of the present invention.

FIG. 9A is a top view showing a second example of the stator that constitutes the radial gap type rotating electrical machine of the present invention. So far, the mode in which the magnetic member 1 is provided in an end portion of the insulating member 2 has been described. However, as shown in FIG. 9A, the entire insulating member may include a magnetic material. Such an insulating member 2' can be manufactured by injection molding using a material obtained by mixing a magnetic material such as iron powder with resin as a raw material.

If a magnetic material such as iron powder is exposed on a surface of the resin, a surface of the iron powder may be oxidized (becomes rust) and the resin may be cracked. Further, since iron powder is a conductive material, if it exists as a lump or an aggregate, there is a possibility that an eddy current will be generated in that portion due to a change in a magnetic flux of the magnet. In a case where such a loss occurs, it is conceivable that Joule heat is generated due to the eddy current and surrounding resin is heated to a high temperature to be softened or melted. For this reason, in a case of using pure iron powder, it is necessary to make measures such as reducing the particle size to reduce the content.

Figure 9B:
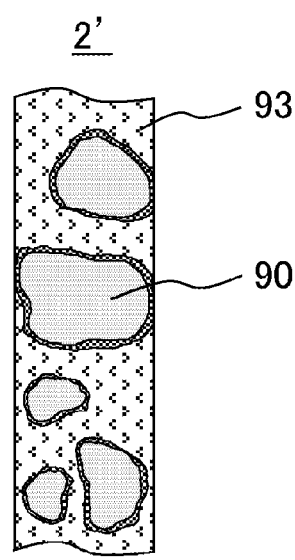
FIG. 9B is a diagram enlarging an insulating member of FIG. 9A.
Figure 9C:
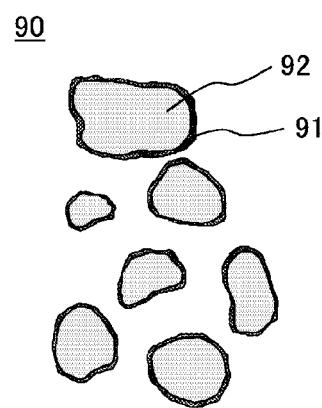
FIG. 9C is a diagram enlarging a magnetic material of FIG. 9A.

FIG. 9B is a diagram enlarging an insulating member of FIG. 9A, and FIG. 9C is a diagram enlarging a magnetic material of FIG. 9B. FIG. 9B shows an example of using inorganic film coating iron powder 90 used for a dust core instead of iron powder. This inorganic film iron powder for a dust core has an insulating film 91 such as an inorganic material (phosphoric acid type) formed on a surface of iron powder (maximum particle size is about 0.2 mm) 92 that is atomized with water or gas. This film is strong and ensures insulation even by a slight press deformation. The insulating member 2' can be molded by mixing such a material with a material for injection molding. Since a surface of the iron powder 92 is covered with the insulating film 91, even in a case where the iron powder appears on a surface of a molded body, there is a little problem of oxidation or insulation performance deterioration. Even in a case where the powers aggregate, insulation is ensured for each of the powders, and occurrence of a large eddy current loss can be prevented. By using such a material, both insulating performance and magnetic material performance can be obtained, so that it is possible to constitute the entire insulating resin bobbin with this material.

The magnetic material may be included in the entire insulating member 2', or may be included only in an end portion on a side facing the rotor. As shown in FIG. 9A, even if the magnetic material is included not only in the end portion of the insulating member 2' but also in the entire insulating member 2', it does not hinder the flow of a magnetic flux in the motor, and rather, increases a cross-sectional area of the tooth and a cross-sectional area of a core back portion to increase an effective magnetic flux amount and contribute to improvement in motor performance.

Figure 10:
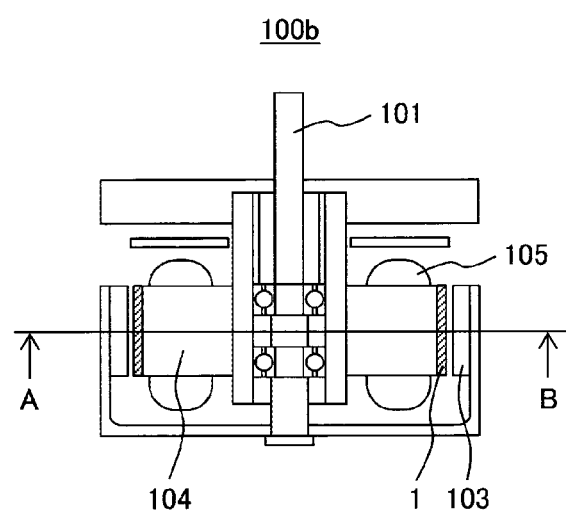
FIG. 10 is a cross-sectional view showing another example (outer rotor type) of the radial gap type rotating electrical machine of the present invention.

FIG. 10 is a cross-sectional view showing another example (outer rotor type) of the radial gap type rotating electrical machine of the present invention. The present invention is not limited to an inner rotor type radial gap type rotating electrical machine, but can be applied to an outer rotor type radial gap type rotating electrical machine as shown in FIG. 10.

As described above, it is proved that, according to the present invention, a radial gap type rotating electrical machine using amorphous metal that can realize high efficiency and is excellent in productivity, its manufacturing apparatus, and its manufacturing method can be provided.

Note that the present invention is not limited to the above embodiment and includes a variety of variations. For example, the above embodiment is described in detail for easy understanding of the present invention, and the present invention is not necessarily limited to an embodiment that includes all the described configurations. Further, part of a configuration of a certain embodiment can be replaced with a configuration of another embodiment, and a configuration of a certain embodiment can also be added to a configuration of another embodiment. Further, for part of a configuration of each embodiment, other configurations may be added, removed, or replaced.

REFERENCE SIGNS LIST 1 magnetic member
2 insulating member
3 tooth
4 back yoke
5 coil conductor
10 housing
11 stator iron core
12 stator coil
13 permanent magnet
14 rotor iron core
17 shaft
18 bearing
19 end bracket
20 insulating material
30 amorphous metal foil strip
40 laminate of amorphous metal foil strip
21, 22 injection mold die
23a, 23b resin injection port
25, 25a, 25b plunger
26, 26a, 26b cylinder 90 magnetic material
91 insulating film
92 iron powder
93 resin
100a radial gap type rotating electrical machine (inner rotor type)
100b radial gap type rotating electrical machine (outer rotor type)
200 stator

The invention claimed is:

1. A radial gap type rotating electrical machine, comprising:
   a rotor including a rotary shaft and a rotor iron core that rotates around the rotary shaft; and
   a stator including a stator iron core that is disposed to face the rotor iron core, wherein
   the stator iron core has an annular shape and has a back yoke having a plurality of recesses provided along an inner periphery of the back yoke, and a tooth having one end fitted to a recess of the plurality of recesses and the other end protruding toward the rotor iron core,
   the tooth has a laminate in which amorphous metal foil strips having a trapezoidal cross-section are laminated in an axial direction of the rotary shaft, and an insulating member that holds the laminate, and
   a magnetic material is provided only in an end portion of the insulating member on a side facing the rotor of the insulating member, the magnetic material extending only on the end portion of the insulating member,
   wherein the magnetic material is a magnetic member having an annular shape that covers only a part of the end portion of the insulating member on a side facing the rotor of the insulating member,
   wherein the magnetic member has a thickness of 1 mm or more and 2 mm or less,
   wherein a coupling surface between the insulating member and the magnetic member has a corrugated shape, and
   wherein the magnetic material has a composition of at least one of Fe—Si—B, Fe—Si—B—Cr, or Co—Fe—Ni—Si—B—Mo.

2. The radial gap type rotating electrical machine according to claim 1, wherein the end portion of the insulating member on which the magnetic member is provided has a projection portion having different dimensions on left and right, and the insulating member in the projection portion has a portion that overlaps with a projection portion of an adjacent tooth.

3. The radial gap type rotating electrical machine according to claim 1, wherein the magnetic material is a soft magnetic material, a hard magnetic material, or a composite material of a soft magnetic material or a hard magnetic material and resin.

4. The radial gap type rotating electrical machine according to claim 1, wherein the magnetic material has an insulating film provided on a surface of a soft magnetic material or a hard magnetic material.

5. The radial gap type rotating electrical machine according to claim 1, wherein a coil conductor wound around the tooth is of concentrated winding or distributed winding.

* * * * *